Figure 1:
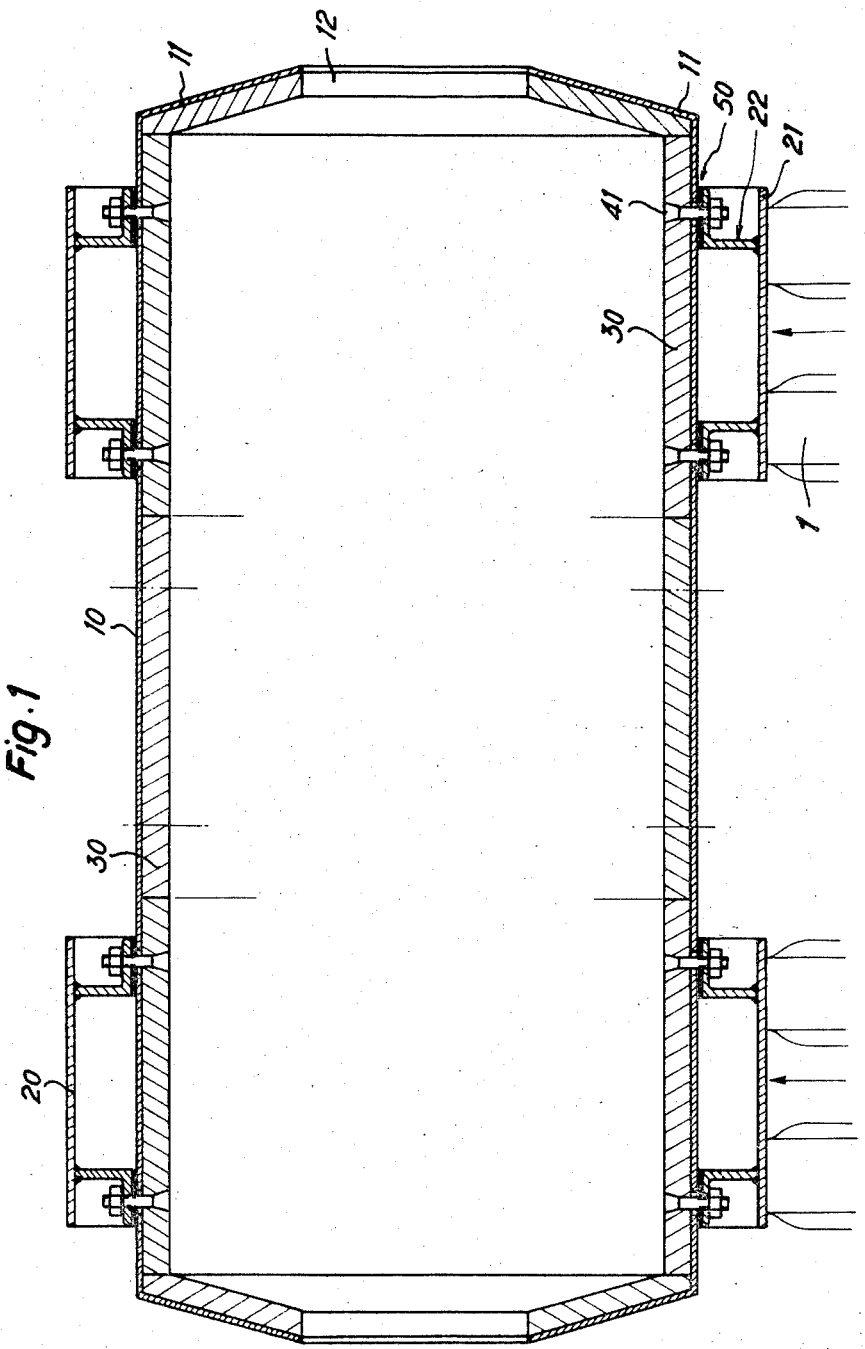

United States Patent
Quesnel et al.

[15] 3,701,487
[45] Oct. 31, 1972

[54] ROTATABLE DRUM DEVICE

[72] Inventors: Guy Quesnel, 7, Parc Vatonne Yvette a, Gif 91; Francis Feugere, 20, rue du General Leclerc, St-Remy-les-Chevreuses 78, both of France

[22] Filed: Feb. 3, 1971

[21] Appl. No.: 112,351

[30] Foreign Application Priority Data

Feb. 5, 1970 France.....................7004090

[52] U.S. Cl..................................241/178, 241/182
[51] Int. Cl............................................B02c 17/24
[58] Field of Search......241/170, 176, 178, 179, 182, 241/183

[56] References Cited

UNITED STATES PATENTS

| | | |
|---|---|---|
| 1,128,901 | 2/1915 | Posselt.....................241/183 |
| 1,174,160 | 3/1916 | Jensen......................241/183 |
| 3,056,561 | 10/1962 | Hukki....................241/178 X |
| 3,185,192 | 5/1965 | Delcellier..............241/178 X |
| 3,286,747 | 11/1966 | Delcellier..............241/182 X |

Primary Examiner—Granville Y. Custer, Jr.
Attorney—Waters, Roditi, Schwartz & Nissen

[57] ABSTRACT

A rotatable drum device, such as ball mill or the like, including a cylindrical drum having an internal lining, external hooks encompassing the periphery of the drum adjacent the ends thereof and adapted to be supported on and rotated by pneumatic tires. The tracks are fastened to the lining by suitable bolts or rivets passing through larger dimensioned apertures in the drum to permit relative lateral movement between the drum, the lining and the bolts or rivets. Flexible and malleable material may be interposed between the outer periphery of the drum and the radially innermost surfaces of the tracks to compensate for radial deformations.

6 Claims, 2 Drawing Figures

ROTATABLE DRUM DEVICE

The present invention relates to a rotatable drum device, and particularly, though not exclusively, a rotatable drum device in the form of a ball mill.

According to one aspect of the present invention there is provided a rotatable drum device comprising a cylindrical drum provided with an internal lining, external annular tracks being fastened directly to the lining through the walls of the drum and surrounding the periphery of the drum, the tracks being supported on a plurality of pneumatic tires which serve simultaneously to support and rotate the drum via its lining.

Preferably the tracks are fastened to the lining by bolts or rivets which pass through apertures formed in the wall of the drum, which apertures have substantially greater dimensions than the bolts or rivets which pass therethrough. Thus a certain amount of lateral play is permitted between the drum and the coupling to allow the drum to deform independently of the tracks. The drum thus becomes a single enclosure which is not required to transmit any substantial tangential forces. The construction of the tracks per se is simplified by this arrangement.

In a first preferred embodiment, the tracks comprise welded profiled sections which are attached to the lining by bolts, the heads of the bolts being disposed within the thickness of the lining.

In a second preferred embodiment, the tracks include a section of synthetic or natural rubber, on to which is vulcanized a rolling strip, the rubber section being bolted to the lining.

Figure 2:
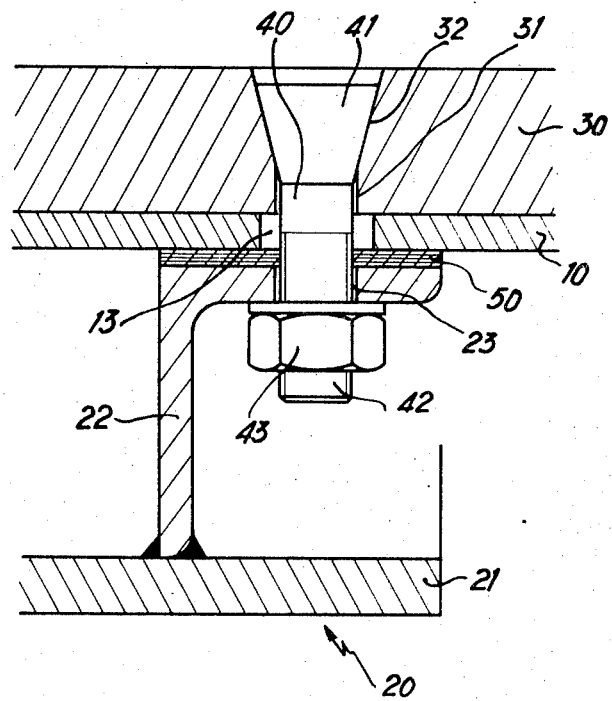

These and other aspects of the present invention will now be described with reference to the accompanying drawings, in which:

FIG. 1 shows a rotatable drum device in the form of a ball mill in longitudinal cross-section, and FIG. 2 shows a cross-sectioned view of a detail of FIG. 1 to an enlarged scale.

FIG. 1 shows a rotatable drum device in the form of a ball mill supported and driven by pneumatic tires 1, comprising a cylindrical drum 10, tracks 20, and drum linings 30. The drum 10 has two ends 11 each provided with inlets and outlets 12 for the loading and unloading of a grinding mechanism and the products before or after treatment. The assembly of the linings 30 covers the whole of the inside face of the drum. The linings 30 are fixed to or positioned on the inside of the drum in a manner known in the art. The linings also have apertures 31 each having a conical portion 32.

Two tracks 20 are arranged in proximity to the ends and extend about the periphery of the drum 10. Each of the tracks comprises a plurality of arcuate parts which are independently fastened to the lining 30. Each of the parts comprises a rolling strip 21 and rolled sections 22 which are provided with apertures 23. The coupling of the various parts of the track is effected by means of bolts 40, the conical heads 41 of which are each arranged in the conical portions 32 of the apertures 31 in the lining, Threaded ends 42 of the bolts act in conjunction with nuts 43 which bear on the rolled sections 22. Between the linings 30 and the sections 22, the bolts 40 pass through the drum 10 via the apertures 13, which are of substantially greater dimensions than the dimensions of the bolts 40, so as to permit some lateral movement of the drum relative to the lining and the tracks. There may advantageously be inserted between the rolled sections 22 and the drum 10 a sheet formed of a relatively malleable and flexible material 50, such as annealed copper, asbestos, rubber, or a fibrous material.

The various arcuate parts which constitute the tracks may be assembled either contiguously or with an annular clearance between the outer peripheral surface of the drum and the radially inner surfaces of the rolled sections 22, into which there may advantageously be inserted a flexible and malleable material such as, for example, rubber which is compressed upon assembly. The latter method possesses the advantage in allowing for the expansion of the various parts without the entire assembly being subjected to any substantial deformations, particularly when the material being treated is heated, for example, by the circulation of hot gas within the drum.

The present invention is of course not limited to the described embodiment. It relates to all rotatable drum devices used for grinding or crushing in which the tracks are fixed to the linings, and particularly devices in which the tracks are formed of solid sections of rubber, the external surfaces of which are vulcanized to form a rolling strip.

The fastening of the tracks to the lining may be effected in any suitable manner, such as by incorporating in the material of the lining elements which project externally thereof and which are thus able to be fastened to the tracks.

The fastening of the track to the lining eliminates any forces which would tend to be generated between the track and the drum if the track were fastened to the drum as by means of welding, riveting or bolting. Such forces are the tangential forces of the tires driving the track which are transmitted via the drum to the lining thereof and then possibly to grinding means for grinding products within the drum to be treated. If the track is directly fixed to the drum, the drum is continuously subjected to alternating forces of traction, torsion and shear. Thus these forces are transmitted directly between the track and the lining.

We claim:

1. A rotatable drum device comprising a cylindrical walled drum, an internal lining provided within the wall of the drum, external tracks about the exterior of the drum, coupling means for coupling the tracks directly to the lining through the walls of the drum, a plurality of driving pneumatic tires in driving co-operation with the tracks for supporting and causing rotation of the drum.

2. A rotatable drum device according to claim 1 in which each track comprises a plurality of arcuately curved rolled sections and a circumferentially extending rolling strip encompassing said rolled sections.

3. A rotatable drum device according to claim 1 in which each track comprises a band of rubber hardened on its external surface.

4. A rotatable drum device according to claim 1 in which the coupling means pass through apertures in the wall of the drum of substantially larger dimensions than said coupling means.

5. A rotatable drum device according to claim 4 in which each track comprises a plurality of arcuately curved rolled sections and a circumferentially extending rolling strip encompassing said rolled sections.

6. A rotatable drum device according to claim 4 in which each track comprises a band of rubber hardened on its external surface.

* * * * *